United States Patent
Kahnau et al.

[19]

[11] Patent Number: 6,078,107
[45] Date of Patent: Jun. 20, 2000

[54] PROCESS AND DEVICE FOR SHUTTING OFF A MOTOR VEHICLE HEATING DEVICE

[75] Inventors: Günter Kahnau, Starnberg; Helmut Nigst, Gilching, both of Germany

[73] Assignee: Webasto Thermosysteme GmbH, Stockdorf, Germany

[21] Appl. No.: 09/173,568

[22] Filed: Oct. 16, 1998

[30]   Foreign Application Priority Data

Oct. 16, 1997 [DE] Germany ............................ 197 45 864
Nov. 11, 1997 [DE] Germany ............................ 197 49 822

[51] Int. Cl.⁷ ...................................................... B60H 1/06
[52] U.S. Cl. ........................... 307/10.1; 307/125; 165/42; 219/202; 237/2 R; 237/5; 361/23
[58] Field of Search ..................................... 307/9.1, 10.1, 307/125; 236/91 C, 36; 237/2 R, 5; 165/202, 42; 219/202; 361/23, 30

[56]              References Cited

U.S. PATENT DOCUMENTS 4,418,743  12/1983  Dietzsch et al. ............................ 237/5
4,598,581   7/1986  Brekke ..................................... 73/117.3
4,944,454   7/1990  Widemann et al. .
5,571,432  11/1996  Sarbach ..................................... 219/202
5,878,950   3/1999  Faccone et al. ............................. 237/2

FOREIGN PATENT DOCUMENTS 35 21 372  12/1986  Germany .

*Primary Examiner*—Albert W. Paladini
*Attorney, Agent, or Firm*—Nixon Peabody LLP; David S. Safran

[57]              ABSTRACT

A process and a device for shutting off of a motor vehicle heating device in which a liquid heat exchange medium is heated by a heating device and is delivered to a heat exchanger of the heating device by means of a circulating pump driven by an electric motor. To prevent damage to the heating device or the circulating pump when the heat exchange medium circuit is not adequately filled with liquid heat exchange medium or in the case of poor venting, a value which at least indirectly indicates the power consumption of the electric motor is sent to a control device as a signal indicative of the existence of a delivery fault associated with the circulating pump.

12 Claims, 3 Drawing Sheets

PROCESS AND DEVICE FOR SHUTTING OFF A MOTOR VEHICLE HEATING DEVICE

BACKGROUND OF THE INVENTION

1. Field of the Invention

The invention relates to a process for shutting off a motor vehicle heating device in which a liquid heat exchange medium is heated by a heating device, and is delivered to a heat exchanger of the heating device by means of a circulating pump that is driven by an electric motor, with at least one control device which controls the operation of heating device, and at least partially also the operation of circulating pump, and to which a signal regarding an operating fault of the components triggered by it can be sent via at least one signal line. The invention also relates to a process for controlling such a heating device so as to prevent its overheating.

2. Description of Related Art

A motor vehicle heating device operated with a liquid heat exchange medium is known, for example, from German Patent No. DE-C2 35 21 372. In it, the action of a circulating pump for delivery of the liquid heat exchange medium to a heat exchanger of the heating device is connected to the action of the control device of the motor vehicle heating device such that, via a signal sent to the control device, in this case, a temperature signal at the output of the heat exchanger, the rpm of the circulating pump is controlled. In another motor vehicle heating device, known from DE-A1 38 29 244 and corresponding U.S. Pat. No. 4,944,454, a signal which indicates overheating of the heating device is acquired by means of a sensor attached to the heat exchanger and is sent to the control device. This acquisition of a case of overheating functions only relatively late when the system is not filled with liquid heat exchange medium or when the system is not adequately vented and for the air bubbles associated therewith so that, in these cases, the heating device or the recirculating pup can be damaged.

SUMMARY OF THE INVENTION

A primary object of the present invention is to provide a a motor vehicle heating device and process in which the need for shutting off of the device, due to a fault in the heat exchange medium circuit, is reliably and quickly recognized.

This object of the invention is achieved, with respect to the device, by a value which at least indirectly indicates the power consumption of electric motor being sent to a control device as a signal indicating a delivery fault of a circulating pump in the heat exchange medium circuit. With respect to the process, this object is achieved by process steps in which a value which indicates the power consumption of the electric motor (for example, the rpm, motor current, or voltage)is acquired and is evaluated by an evaluation logic with respect to whether the value corresponds to operation of the circulating pump in an operating range above a first operating point and below a second operating point, so that the circulating pump is shut off when the second operating point is exceeded, and a signal for shutting off heating device is delivered.

The idea behind this invention, both with respect to the device and the process, calls for a value being sent to the control device which at least indirectly indicates the power consumption of the electric motor which drives the circulating pump. The basic idea follows from the consideration that, in case of clogging in the circulating pump or a pump speed below the normal operating range or a power consumption in excess proportion to the speed, or when the heat exchange medium circuit is not filled or vented, in which there is air in the circulating pump, a speed of the circulating pump above the normal rpm or a speed of the circulating pump which is too high or too low with respect to the current power consumption occurs.

Accordingly, in one especially advantageous embodiment of the invention, the signal sent to the control device takes into account the rpm of the circulating pump or the electric motor. Additionally or alternatively, the power consumption of the electric motor or a voltage signal can be acquired which, for example, is delivered by a tachogenerator connected to the electric motor as a rpm-proportional signal.

According to another especially advantageous embodiment of the invention, the electric motor is an electronically commutated brushless motor. In this motor, the trigger values for commutation can be acquired directly in the evaluation logic.

It is furthermore advantageous when to the electric motor of the circulating pump is assigned its own control device with evaluation logic from which an output signal is delivered to the control device of the motor vehicle heating device. This circulating pump with an integrated evaluation logic can be used universally in any heating device and does not require any special adaptation to the specific control device of one specific such heating device.

In the process in accordance with the invention, as essential process steps it is provided that, on the one hand, a value which indicates the power consumption of the electric motor is acquired, that in the second step this value is evaluated by evaluation logic with respect to a normal operating range which is limited by a first lower operating point and a second upper operating point, that in the third step the circulating pump is shut off when a value outside of the normal operating range is ascertained and that fourth, a signal for shutting off the heating device is generated.

As advantageous embodiments, it is provided that, between the second and third process step, as an additional process step, the determined value is checked according to an attached time loop or by compensation with additional parameters. This is designed to ensure that an ascertained speed which is different from the normal operating range is not simply a temporary, brief (transient) fault which would then erroneously lead to shutoff. Finally, it is advantageous if, before shutting off the circulating pump, a fault flag is set in addition, this flag being evaluated when the heating device is shut off and restarted. This prevents the detected fault in the heat exchange medium circuit from remaining ignored upon restarting of the heating device after the shutting off of the motor vehicle heating device which takes place at this point. Evaluating the existing fault flag upon restart ensures that the motor vehicle heating device first runs through a test routine which prevents unintentional starting of the faulty heating device.

The above described fault flag is advantageously automatically extinguished by running through a time loop before the signal for shutting down the heating device. When the heating device restarts, a test routine for monitoring proper operation of the circulating pump is run anyway before starting the heating device.

In the following, one embodiment of the invention is described using the drawings.

DETAILED DESCRIPTION OF THE INVENTION

Figure 1:
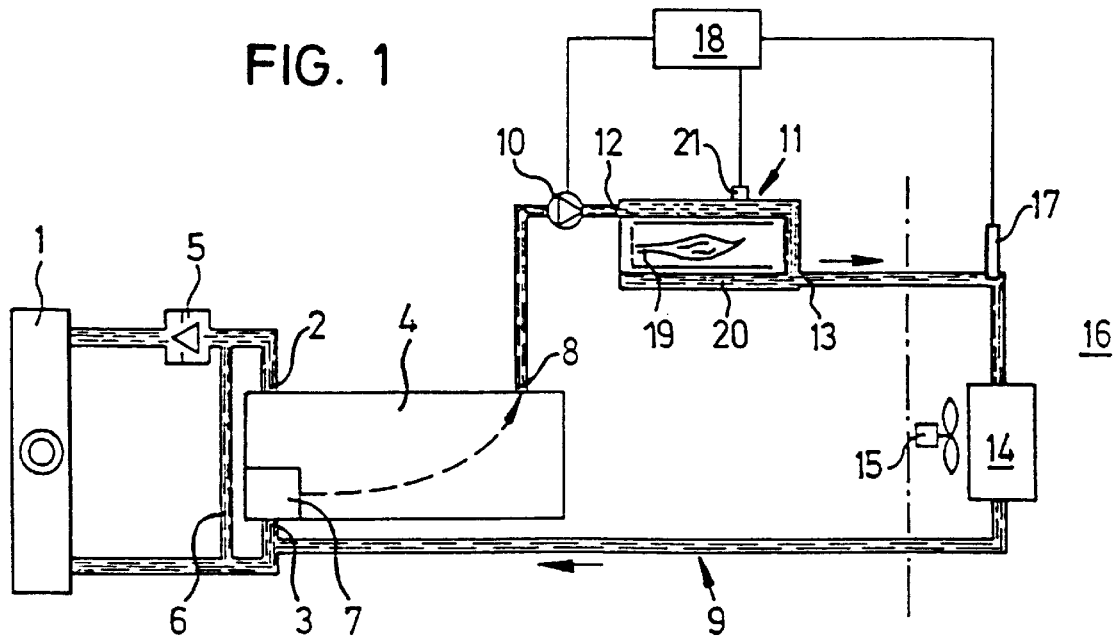
FIG. 1 shows a schematic of a heating circuit of a motor vehicle.

In FIG. 1, the heating circuit of a motor vehicle is shown schematically in which the liquid heat exchange medium used to cool an engine block 4, for cooling purposes, is sent via a coolant outlet 2 to a cooler 1, such as a radiator. From cooler 1, the heat exchange medium flows via inlet 3 back to engine block 4. Thermostat valve 5 in the supply line to cooler 1, in conjunction with bypass line 6, prevents flow through cooler 1 in the starting and warmup phase of engine block 4. For conveyance of the liquid heat exchange medium, on engine block 4, there is an engine circulating pump 7 which is responsible both for delivery of the heat exchange medium to cooler 1 and also delivery thereof, via another coolant outlet 8, into a heating circuit 9.

In heating circuit 9, on the supply side of a motor vehicle heat exchanger 14, there are a circulating pump 10 and a motor vehicle heating device 11. Circulating pump 10 is connected via an inlet 12 to the motor vehicle heating device 11. Between an outlet 13, from which the heat exchange medium flows from motor vehicle heating device 11 to the motor vehicle heat exchanger 14, and this motor vehicle heat exchanger 14, there is temperature sensor 17 which measures the temperature of the heat exchange medium and relays it to a control device 18. Control device 18 controls all important functions of motor vehicle heating device 11, for example, a fuel pump which belongs to heating device 19, a combustion air fan which likewise belongs to the heating device, a glow or ignition means which is required at least in the starting phase of the heating device, and operation of circulating pump 10.

Besides the temperature signal from temperature sensor 17, an overheating signal is sent to control device 18 from an overheating sensor 21 which is located in the region of a heat exchanger 20 of motor vehicle heating device 11 through which the liquid heat exchange medium flows. In this case, control device 18 controls not only the function of circulating pump 10, but the line drawn between the two components is also used as a signal line from the circulating pump 10 to the control device 18.

A heating fan 15 that is assigned to motor vehicle heat exchanger 14 is used to deliver air via motor vehicle exchanger 14 into the vehicle interior 16 shown schematically.

Figure 2:
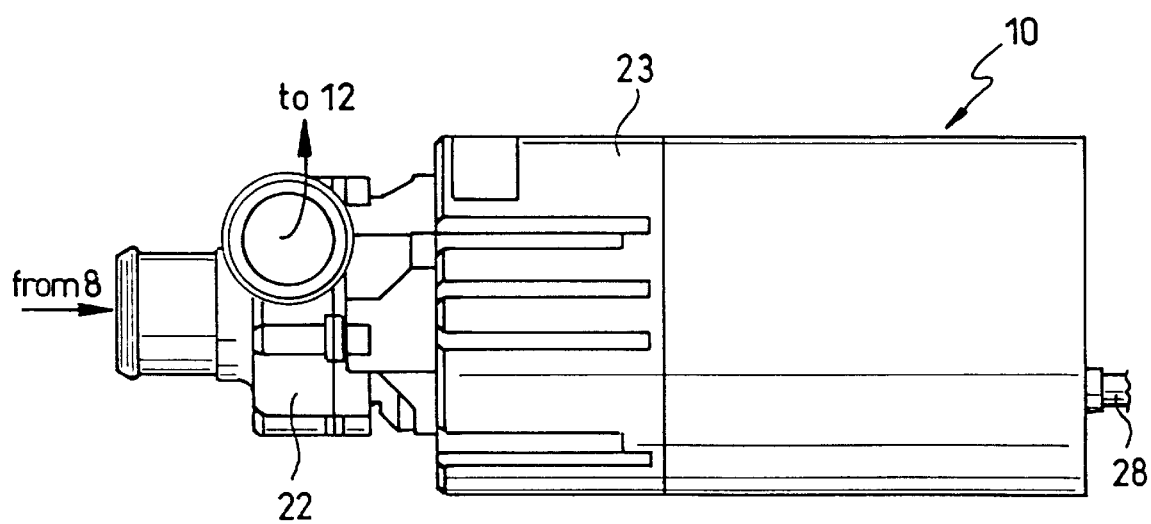
FIG. 2 shows a circulating pump with the driving electric motor from the FIG. 1 circuit.

FIG. 2 shows circulating pump 10 enlarged. The term circulating pump here encompasses both the mechanical part for delivery of liquid heat exchange medium which is surrounded by pump housing 22 and also the electrical part surrounded by motor housing 23. The pump housing 22 has two connections, one of which is connected to the supply line which originates from the coolant outlet 8 of engine block 4, and the other of which is connected to inlet 12 of motor vehicle heating device 11.

Figure 3:
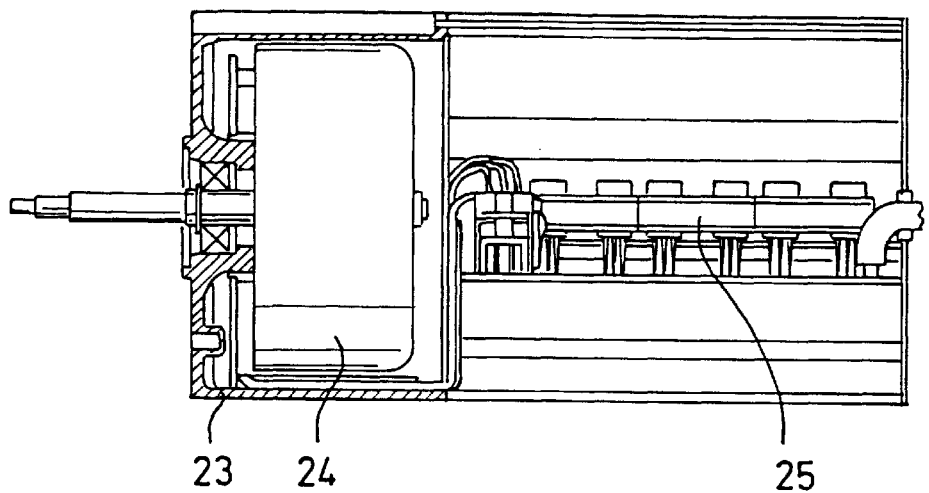
FIG. 3 shows a longitudinal section through the motor of the FIG. 2 circulating pump.

FIG. 3 shows motor housing 23 cutaway. Here, it can be recognized that the electric motor 24 for driving the circulating pump is located in the left-hand part of the housing, while in the right hand part there is an independent control device 25 with different components for triggering electric motor 24. Control device 25 has its own evaluation logic in which a speed or a voltage signal proportional to the speed of the electric motor is evaluated, optionally, with consideration of other parameters, for example, the consumed motor current.

Figure 4:
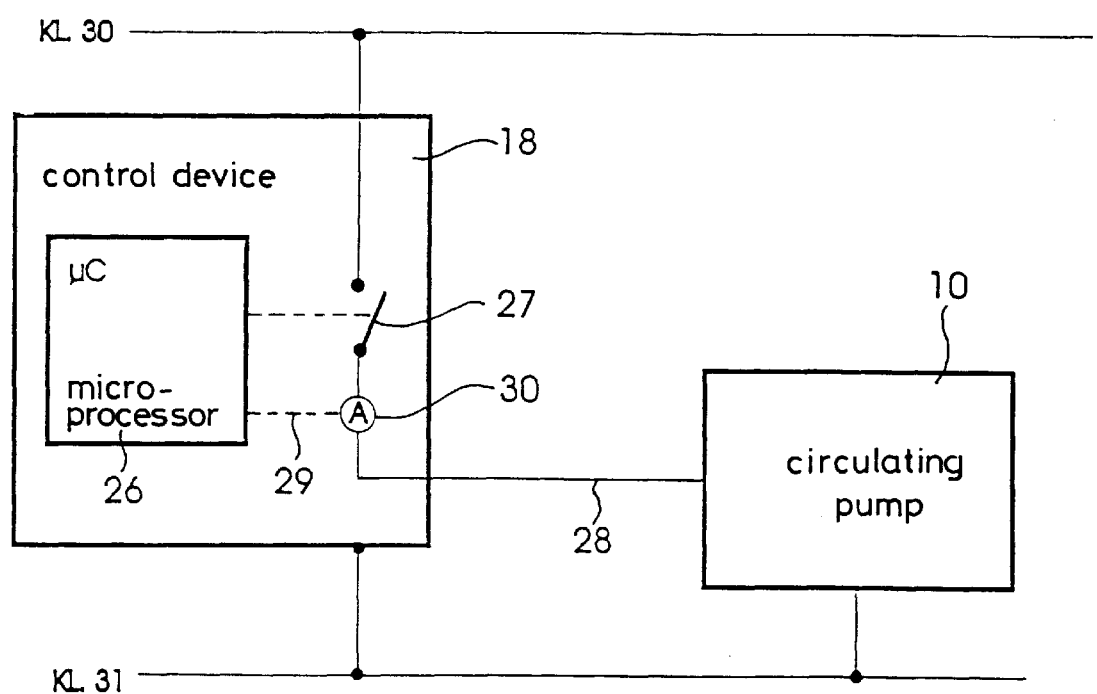
FIG. 4 is a circuit diagram illustrating an electrical connection between the control device and the circulating pump.

FIG. 4 shows the connection between the control device 18 which controls the overall functioning of motor vehicle heating device 11, and control device 25 of circulating pump 10. Control device 18 has a microprocessor 26, by which all process sequences of the motor vehicle heating device 11 are controlled. Among others, microprocessor 26 also actuates a switch 27, for example, by means of a switching relay or power transistors. With switch 27 closed, via power line 28, control device 25 is connected to the electric circuit of the motor vehicle, represented by KL. 30 and KL. 31 for the positive pole of the battery and ground. Power line 28 is used in certain operating states at the same time as a signal line between control device 25 and microprocessor 26 of control device 18.

Specifically, if operation of circulating pump 10 is recognized by the evaluation logic of control device 25, in which, for example, the rpm n is below lower operating point $n_1$ or above upper operating point $n_2$, a fault in the area of the heat exchange medium circuit is concluded and circulating pump 10 is transferred into a sleep mode. In this rest mode the consumed power is returned to a minimum value of I=2 mA by control device 25. On the low current which flows via power line 28, current measurement by an ammeter 30 recognizes that there is a fault; it is relayed via signal line 29 to microprocessor 26 of control device 18. This signal is then used for interruption of the operation of heating device 19.

The above described device can effectively prevent overheating of the motor vehicle heating device 11 when the system is not filled with liquid heat exchange medium, or in the case of defective venting when, for example, there are gas bubbles in the area of circulating pump 10. Specifically, if little or no liquid heat exchange medium is flowing through heat exchanger 20, in the operation of heating device 19, the area of the combustion chamber and inner walls of heat exchanger 20 would overheat very quickly, and before this, on the outside wall of the heat exchanger 20, an overheating sensor 21 would recognize an increase of the temperature to an unallowable value. The described device thus greatly increases the operating reliability of a motor vehicle heating device.

Figure 5:
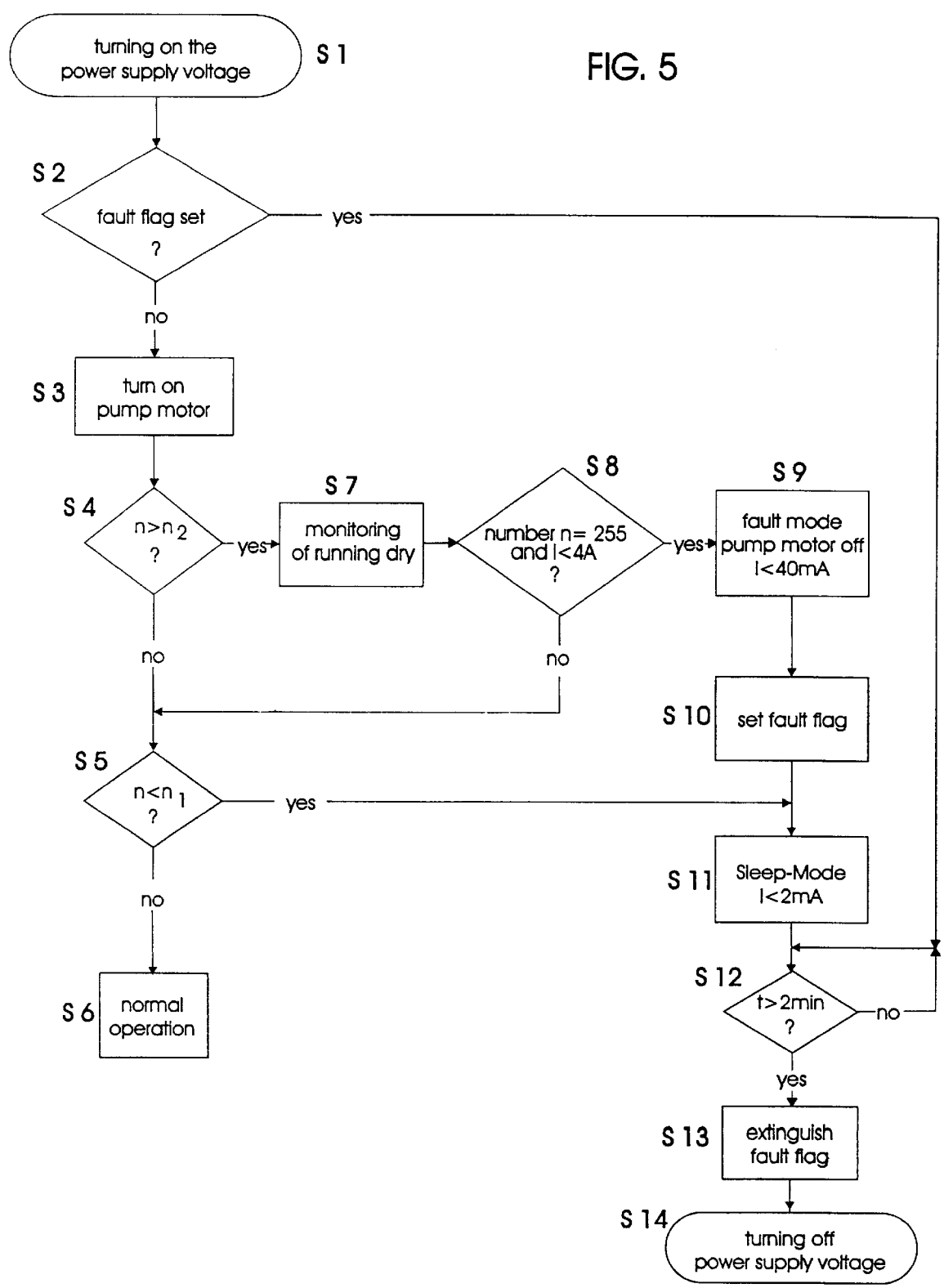
FIG. 5 is a schematic flow chart of the process steps for implementation of the process of the invention.

In the following the process steps necessary to implement the process of the invention with optional advantageous developments are described with reference to FIG. 5. In first process step S1, the power supply voltage of circulating pump 10 is turned on by switch 27. All following process steps S2–S14 are executed in the described preferred embodiment by circulating pump 10's own intelligent control device 25. In a simpler version, however, it is also contemplated that the corresponding signal is acquired by corresponding sensors on the electric motor of the circulating pump and that these signals are evaluated in an evaluation logic in the control device 18 of the motor vehicle heating device.

In second process step S2, whether a fault flag is set is checked. If this is not the case, in process step S3, the electric motor 24 of circulating pump 10 is turned on. In process step S4, it is checked to determine whether speed n of electric motor 24 or of circulating pump 10 is greater than upper operating point $n_2$ which represents the upper limit of the normal operating range of the circulating pump. If this is not the case, in another process step S5, it is checked to determine whether the speed n of electric motor 24 or of circulating pump 10 is greater than the first operating point $n_1$ which characterizes the lower limit of the normal operating range of circulating pump 10. If this is not the case, operation of circulating pump 10 in process step 6 is continued normally. The cycle of process steps S2 through S6 can take place once upon each restart of heating device 11 or also continuously or periodically during ongoing operation.

If it is ascertained in fourth process step S4 that the determined speed ii is greater than second operating point $n_2$, in process step S7, monitoring of dry running of circulating pump 10 is started. To do this, in process step S8, the rpm of circulating pump 10 or of electric motor 24 is checked in a multiple loop in conjunction with the motor power consumption prevailing in this case. In this case, at a speed of circulating pump 10 which in normal operation is, for example, roughly 5500 rpm, during 255 revolutions, i.e., for a period of roughly 3 seconds, it is checked whether the power consumption of electric motor 24 is less than 4 amps. The boundary value of 4 A corresponds to the value of the electric motor power consumption for which sufficient liquid heat exchange medium 10 is delivered to prevent damage to heat exchanger 20. If this value is exceeded, i.e. the question in process step S8 is answered no, the sequence branches to the path between process steps S4 and S5. If on the other hand the query in process step S8 is answered yes, i.e. during the measured 255 rpm the power consumption of the electric motor is less than 4 amps, it is assumed that circulating pump 10 is essentially delivering air. As a result, in process step S9, a fault mode is triggered in which electric motor 24 is shut off, its power consumption being less than 40 mA. Thereupon, a fault flag is set in process step S10.

In following process step S11, control device 25 is transferred into a sleep mode in which the power consumption I is equal to 2 mA. If the above desired query in process step 5 yields a positive answer, the resulting arrow in the diagram of FIG. 5, likewise, ends in the path before process step S11. This means that when speed n falls below lower threshold $n_1$ which corresponds to clogging or blocking, the sleep mode is likewise triggered.

In now subsequent process step S12, a time loop of 2 minutes is run through. The path which is derived from process step S2 in a positive response of the query there likewise ends in its recursive path. After the time loop in process step S12 is passed the set fault flag in process step 13 is extinguished and in process step S14 the supply circuit of control device 25 is turned off. Here, switch 27 is opened by microprocessor 26 of control device 18.

Depending on the required safety stage of motor vehicle heating device 11 used, either recognition of a fault mode in process step S9 or setting of a fault flag in process step S10 or setting of the sleep mode in process step S11 can be used to either reduce the power of heating device 19 or zero it. The fault flag is used to re-evaluate a recognized operating fault when motor vehicle heating device 11 is shut off after recognition of a fault mode in process step S9 when the motor vehicle heating device is turned on again. In this way, several start attempts of the pump within a short time are avoided; this could damage the pump.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. In a motor vehicle heating device in which a liquid heat exchange medium is heated by a heating device and by means of a circulating pump which is driven by an electric motor is delivered to a heat exchanger of the heating device, and which is provided with at least one control device for controlling operation of the heating device and at least partially also controlling operation of the circulating pump, the improvement comprising a shutoff device electrically connected to at least the control device and the electric motor of the circulating pump, said shutoff device having means for monitoring power consumption of the electric motor and for sending a signal to the control device having a value which at least indirectly indicates the power consumption of the electric motor and being indicative of the existence of a delivery fault associated with the circulating pump.

2. Device as claimed in claim 1, wherein the value of said signal takes is related to the rpm of one of the circulating pump and said electric motor.

3. Device as claimed in claim 2, wherein the value of said signal is directly related to the power consumption of the electric motor.

4. Device as claimed in claim 1, wherein the value of said signal is directly related to the power consumption of the electric motor.

5. Device as claimed in claim 1, wherein said electric motor is as an electronically commutated, brushless motor.

6. Device as claimed in claim 1, wherein said electric motor is connected to a tachogenerator which delivers a voltage proportional to the rpm of the electric motor as said signal to the control device.

7. Device as claimed in claim 1, wherein the electric motor of the circulating pump has a control device with evaluation logic from which said signal is sent to the control device of the motor vehicle heating device.

8. Process for shutting off a motor vehicle heating device to prevent its overheating comprising the steps of:
   a) acquiring a value which is indicative of power consumption of an electric motor of a circulating pump of the heating device;
   b) evaluating said value with evaluation logic and determining whether the value corresponds to operation of circulating pump in an operating range above a first operating point or below a second operating point;
   c) shutting off of the circulating pump when it has been determined that the second operating point has been exceeded; and
   d) delivering a signal to a control device of the heating device for shutting off the heating device.

9. Process as claimed in claim 8, wherein between process steps b) and c) the following additional process step is performed:
   e) checking of said value after at least one of completion of a time loop and compensation said with additional parameters.

10. Process as claimed in claim 9, wherein said additional parameters are at least one of temperature and motor power consumption.

11. Process as claimed in claim 9, wherein after process steps b) and e) the following additional step is performed:
   f) setting of a fault flag which is evaluated upon shutoff and restart of heating device.

12. Process as claimed in claim 11, wherein the fault flag is extinguished after running through a time loop prior to process step d).

* * * * *